Jan. 22, 1957 C. R. GORDON 2,778,876

REMOTE CONTROL FOR RECORDING EQUIPMENT

Filed June 17, 1955

INVENTOR
CHARLES ROBERT GORDON
BY [signature]
ATTORNEY 2,778,876

REMOTE CONTROL FOR RECORDING EQUIPMENT

Charles Robert Gordon, Hamilton, Ontario, Canada

Application June 17, 1955, Serial No. 516,083

4 Claims. (Cl. 179—6)

This invention relates to remote switching devices, and more particularly to means for the remote control of recording equipment used in a subscriber's unattended station for answering incoming calls and recording messages from calling parties, and for playing back such recorded messages to the subscriber calling his own station from another station.

Numerous types of recording means and modified dictaphones are known, which are connected to telephone lines and adapted to release a prerecorded message as soon as a call comes in. For this purpose, a subscriber before leaving his station dictates a message into the telephone answering device, to be released in reply to any call during his absence. These telephone answering devices usually comprise magnetic drums as recording means, on which a circular track is provided to store the message impressed by a recording head. In response to an incoming call, which energizes a relay, the telephone answering device is switched on by a contact. Due to a time relay in the device, a sufficient period of time elapses to warm up the amplifier and then to close the loop between both conductors of the telephone line. During this waiting period, the calling party hears the ringing signal. With the loop closed and the amplifier warmed up, the prerecorded message (on the circular track) is played back to the calling party, inviting him to leave a message. For this purpose, a free recording track is provided to receive the message from the calling party. This is achieved by a movable recording head travelling longitudinally over the surface of the rotating magnetic drum, describing a helicoidal path. In this type of recording equipment, it is convenient to confine the track for the prerecorded message to one revolution of the drum, and to prevent any movement of the recording head in the helicoidal track during the release of the prerecorded message. The drum, completing one revolution, returns to its initial position and is now in the correct position to be impressed with the message to be read into the recording device by the calling party. This cycle is repeated until all messages have been recorded in the same sequence as received, the prerecorded message on the circular track being repeated in between.

To read the messages, the subscriber has to return to his station. To overcome this undesirable limitation, several means have been used, enabling a calling party to hear the recorded messages (recorded on the helicoidal track) from a remote station. Such means all have in common the use of a code, mostly consisting of a sequence of pulses to operate switching means in the recorder, the switching means in turn initiating the playback of the records. In order to reduce the incidence of release of messages to unauthorized persons, the coding means used are fairly complex, bulky and expensive.

The principal object of the invention is to provide, in a telephone line, means for the control of recording equipment used at an unattended station for answering incoming calls and recording messages, and for playing back such recorded messages to the subscriber, calling his own, unattended station from another station, such means doing away with special coding means. Such remote control means are readily applicable to telephone lines employing two conductors, and ground to provide a two-channel ringing system.

In the drawing, wherein like numerals of reference indicate corresponding parts in the various figures.

The system applied to the predominant type of automatic telephone exchanges in North America employs a combination of two conductors, and ground, to form a two-channel ringing system. Conveniently, and for the purpose of this invention, one channel, defined by one of the conductors and ground, will be listed in the telephone directory and used for general communication. In the absence of the subscriber, the recording equipment will respond to any call coming in over the ringing channel, and any message will be recorded. The other channel, between the other conductor and ground, will be used to release the playback mechanism. The telephone number for this channel will not be listed in the directory, and will be reserved for the subscriber.

Figure 1:
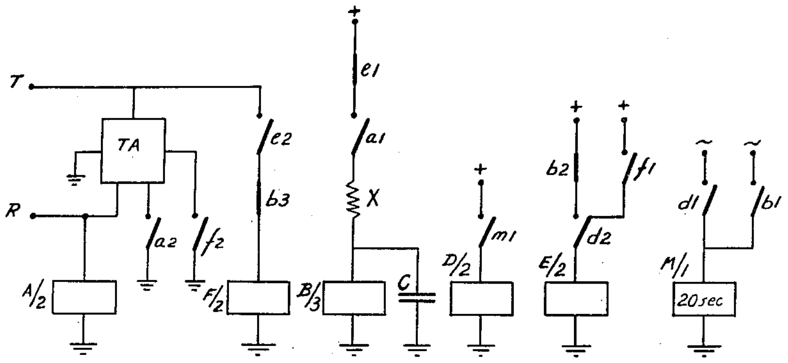
Figure 1 is the circuit diagram of the preferred embodiment of the invention, requiring dialing of two different numbers.

Referring now by numerals to Figure 1, the two conductors are shown as T and R. The conductor R forms with grcund one channel, say the ringing channel. The other conductor, T, forms with ground, the other channel—the playback channel. A conventional recording device, shown as TA, is connected to both conductors and ground, in accordance with the usual practice.

Figure 3:
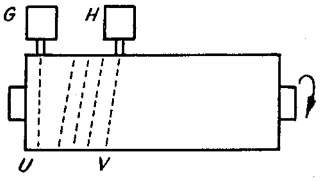

Such a conventional recorder, diagrammatically shown in Figure 3, provides a circular track U and associated recording head G; and a helicoidal track V and associated head H. The circular track U contains a prerecorded message to be repeated in reply to any incoming call; the track V is provided for messages recorded from incoming calls.

To reduce the incidence of playback to unauthorized persons, and this constitutes the gist of my invention, a combination of these two channels, with or without time factor, is used. In accordance with one embodiment of my invention, a subscriber must dial his station (channel R—ground) and obtain one ring only, open the line, and immediately dial another number (channel T—ground) to release the playback mechanism.

The first ringing pulse arriving on the ring side between R and ground, energizes a relay A. Energization of the relay A actuates its two contacts *a*1 and *a*2, to close a normally-open circuit from TA to ground, and a normally-open circuit through a relay B, respectively. A capacitor C, in parallel with the relay B, and a resistor X in the circuit through the relay B, delays the operation of the relay B. Such delay, at least in the order of one second, maintains the contacts in operated position for a certain period of time, following the cessation of the ringing signal. The operation of the relay B actuates its three contacts *b*1, *b*2, and *b*3. Contact *b*1 when operated, closes a normally-open circuit to a time relay M; contact *b*2, normally closed, is in series in a circuit through a relay E; the contact *b*3 is in series in the circuit to a relay F. Contact *m*1 of the relay M closes immediately after the energization of the relay, and remains closed for (say) twenty seconds, providing a path for the relay D. Contact *d*1 of relay D in parallel with *b*1, holds the time relay M energized after the ringing signal through relay A ceases because the subscriber broke the connection in the meanwhile and the relay B opened its contacts after the end of the above-mentioned delay. Through the now (again) closed contact *b2*, the circuit to the relay E is closed through the contact *d2*, because the relay D is still energized. One contact *e1* of the relay E, normally closed, breaks the circuit through the relay B, and the other contact *e2* of the relay E provides a closed path through the relay F.

In accordance with the requirements for release of the playback mechanism by the subscriber, as previously stated, the latter has to dial the other number, of the playback channel (between T and ground) immediately after hearing one ring over the first dialled channel (between R and ground). If the ringing signal over the second channel starts in the given time limit of 20 seconds, the path through T and through *e2*, *b3*, and F is still intact, and the signal will energize the relay F. Contacts *f1* and *f2* of the relay F are normally open, but *f1* closes to provide a holding circuit for the relay E. The relay D will be de-energized by the re-opening of contact *m1* after the end of the twenty second cycle, interrupting the holding circuit of time relay M as *d1* opens, and changing over through its make-before-break contact *d2* to the (closed) holding circuit *f1*, *d2* for relay E. Contact *f2* operates the playback mechanism to release the recorded messages to the subscriber over the channel R and T. During the playback period, only the relays E and F are energized. As soon as the subscriber, at the remote station, has heard all the recorded messages, he breaks the connection, thus interrupting the circuit of relay F, which in turn opens the circuit of the relay E. This will return the system to its initial state, ready again to receive messages.

Figure 2:
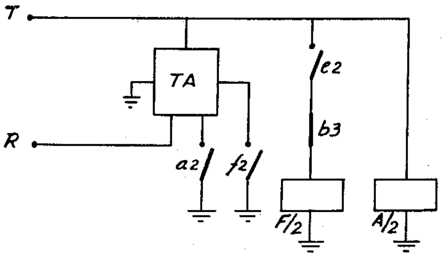
Figure 2 is a modification, requiring the dialing of the same number twice; and, Figure 3 is a schematic view of a typical recorder.

In the modification shown in Figure 2, both the relays A and F are connected to the conductor T. Thus, the other number, reserved for the release of the playback mechanism, has to be dialed twice. Only the modified left side of the circuit has been shown.

The first call arrives between the conductor T and ground to energize the relay A. After sensitizing the circuit for the relay F, the second incoming call releases the playback mechanism.

What I claim is:

1. In a remote switching device for an automatic telephone system, a pair of conductors insulated from ground connected between an automatic telephone exchange and a subscriber's station, one of said conductors and ground defining a first channel, the other of said conductors and ground defining a second channel, a utilization circuit at the subscriber's station, a first means in one of said conductors responsive to a potential impressed thereon to establish a holding circuit, a second means in the other of said conductors responsive to a potential impressed thereon to extend the holding circuit to said utilization circuit, and means including elements of said first and second means adapted co-operatively to operate said utilization circuit when said first and second means are operated in a selected sequence.

2. The combination set forth in claim 1, wherein said first means comprises a relay connected between said one of said conductors and ground.

3. In a remote switching circuit as defined in claim 1, time-dependent elements connected between said first and said second means to retain the operability thereof for a predetermined period of time.

4. In a remote switching circuit as defined in claim 1, said second means comprising relays responsive to a potential over said second conductor only after said first means have been actuated.

References Cited in the file of this patent

UNITED STATES PATENTS 2,709,202 Handschin ------------- May 24, 1955